United States Patent
Fan et al.

(10) Patent No.: US 10,626,061 B2
(45) Date of Patent: Apr. 21, 2020

(54) SYNTHESIS OF ENERGETIC MATERIAL PARTICLES WITH CONTROLLED MORPHOLOGY

(71) Applicant: National Technology & Engineering Solutions of Sandia, LLC, Albuquerque, NM (US)

(72) Inventors: Hongyou Fan, Albuquerque, NM (US); Leanne Julia Alarid, Santa Monica, CA (US); David Rosenberg, Albuquerque, NM (US); Kaifu Bian, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 197 days.

(21) Appl. No.: 15/782,290

(22) Filed: Oct. 12, 2017

(65) Prior Publication Data
US 2019/0039966 A1    Feb. 7, 2019

Related U.S. Application Data

(60) Provisional application No. 62/540,840, filed on Aug. 3, 2017.

(51) Int. Cl.
*C06B 21/00* (2006.01)
*C06B 23/00* (2006.01)
*B01D 9/00* (2006.01)
*C06B 45/02* (2006.01)
*C06B 25/34* (2006.01)

(52) U.S. Cl.
CPC ........ *C06B 21/0091* (2013.01); *B01D 9/0018* (2013.01); *B01D 9/0022* (2013.01); *C06B 21/00* (2013.01); *C06B 21/0033* (2013.01); *C06B 23/00* (2013.01); *C06B 23/009* (2013.01); *C06B 25/34* (2013.01); *C06B 45/02* (2013.01)

(58) Field of Classification Search
CPC .............................. C06B 21/00; C06B 23/00
See application file for complete search history.

(56) References Cited

U.S. PATENT DOCUMENTS

| 3,181,463 A * | 5/1965 | Morgan ..................... 102/202.7 |
| 5,693,794 A * | 12/1997 | Nielsen ................ C07D 259/00 149/92 |
| 5,874,574 A * | 2/1999 | Johnston .............. C07D 487/22 540/475 |

FOREIGN PATENT DOCUMENTS

CN            106518883       *    3/2017

OTHER PUBLICATIONS

Derwent document 2012-G80843, 2012 (Year: 2012).*
Bumpus, J.A., "A Theoretical Investigation of the Ring Strain Energy, Destabilization Energy, and Heat of Formation of CL-20", Advances in Physical Chemistry, vol. 2012 (2012), Article ID 175146, 7 pages (http://dx.doi.org/10.1155/2012/175146).

(Continued)

*Primary Examiner* — Aileen B Felton
(74) *Attorney, Agent, or Firm* — Kevin W. Bieg

(57) ABSTRACT

A surfactant-assisted self-assembly method can be used to crystallize energetic materials with controlled morphology. Microparticles of hexanitrohexaazaisowurtzitane (CL-20) formed by this method may have enhanced functional reproducibility due to their monodisperse nature, and decreased shock sensitivity due to their sub-2 μm particle size.

11 Claims, 9 Drawing Sheets

(56) References Cited

OTHER PUBLICATIONS

Ghosh, M. et al., "Probing Crystal Growth of ε- and α-CL-20 Polymorphs via Metastable Phase Transition Using Microscopy and Vibrational Spectroscopy", Cryst. Growth Des., vol. 14 (2014,), pp. 5053-5063 (dx.doi.org/10.1021/cg500644w).

Urbelis, J.H. et al., "Solvent Effects on the Growth Morphology and Phase Purity of CL-20", Cryst. Growth Des., vol. 14 (2014), pp. 1642-1649 (dx.doi.org/10.1021/cg401774s).

Xu, J. et al., "Polymorphism in hexanitrohexaazaisowurtzitane crystallized from solution", Journal of Crystal Growth, vol. 354 (2012), pp. 13-19 (doi.org/10.1016/j.jcrysgro.2012.05.036).

Zhong, Y. et al., "Interfacial Self-Assembly Driven Formation of Hierarchically Structured Nanocrystals with Photocatalytic Activity", ACS Nano, vol. 8, No. 1 (2014), pp. 827-833 (DOI: 10.1021/nn405492d).

\* cited by examiner

FIG. 3(a) CL-20 feedstock

FIG. 3(b) CL-20 after self-assembly

FIG. 3(c) CL-20 particle size distribution 1.0 mL CL-20/ethyl acetate → Stirring / Emulsion → 10mL Span 80/octane → Vacuum / Remove ethyl acetate

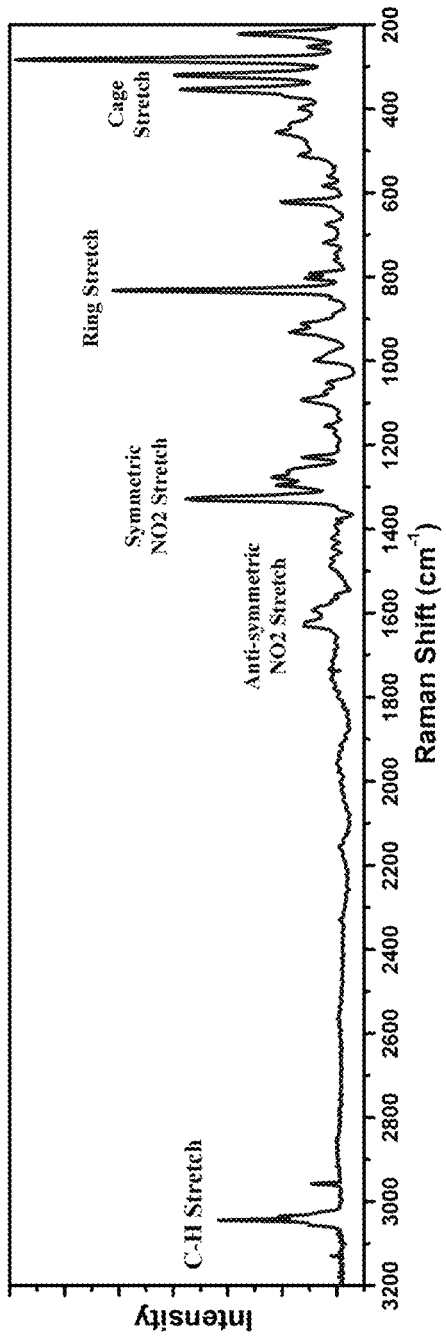
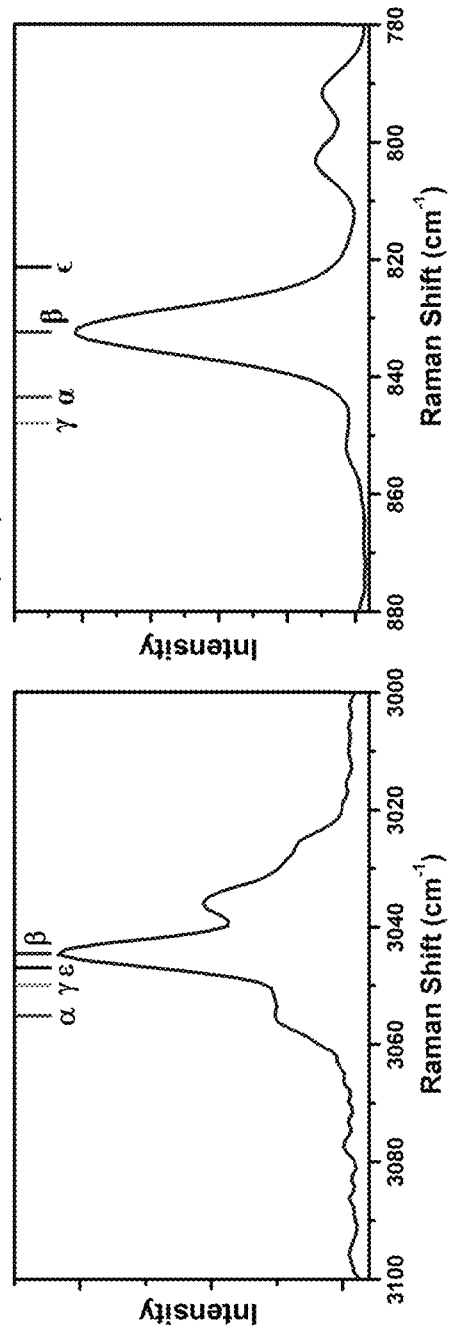
FIG. 7(a)
FIG. 7(b)
FIG. 7(c)

SYNTHESIS OF ENERGETIC MATERIAL PARTICLES WITH CONTROLLED MORPHOLOGY

CROSS-REFERENCE TO RELATED APPLICATION

This application claims the benefit of U.S. Provisional Application No. 62/540,840, filed Aug. 3, 2017, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to energetic materials and, in particular, to the synthesis of hexanitrohexaazaisowurtzitane particles with controlled morphology.

BACKGROUND OF THE INVENTION

Controlled sensitivity, along with maximized energy content of energetic materials (EMs) remains an important aspect of materials engineering to guarantee explosives safety and function. The morphology of crystalline energetic materials, including crystal size, shape, microstructure, and purity of polymorphic phase, play a significant role in determining energetic materials performance, including their shock sensitivity. See M. Ghosh et al., *Cryst. Growth Des.* 14, 5053 (2014). Hexanitrohexaazaisowurtzitane (CL-20) is an EM compound containing six high energy nitro groups per molecule arranged into a strained cage structure that is capable of releasing vast amounts of stored energy through triggered rapid decomposition. See J. A. Bumpus, *Adv. Phys. Chem.,* 175146 (2012). Since its first synthesis in 1989, CL-20 has been the most powerful non-nuclear EM available, ideal for applications in military grade propellants and explosives. See A. T. Nielsen et al., *J. Org. Chem.* 55, 1459 propellants and explosives. See A. T. Nielsen et al., *J. Org. Chem.* 55, 1459 (1990); and U. R. Nair et al., *Combust. Explos. and Shock Waves* 41, 121 (2005). Compared to the energetic properties of other commonly used EMs, CL-20 possesses more favorable properties including much larger heat of formation, better oxygen balance, and higher density. See M. B. Talawar et al., *Combust. Explos. and Shock Waves* 43, 62 (2007); and K. Liu et al., *J. Mol. Struct.* 1110, 91 (2016). For example, CL-20 shows a 14% higher explosive performance than cyclotetramethylene-tetranitramine (HMX) while maintaining nearly equivalent sensitivity. See R. L. Simpson et al., *Propellants, Explos., and Pyrotech.* 22, 249 (1997).

However, CL-20 powder prepared by existing methods consists of irregular crystalline particles. See J. Xu et al., *J. Cryst. Growth* 354, 13 (2012); Y. Bayat et al., *J. Mol. Liquids* 193, 83 (2014); Z. Yang et al., *RSC Adv.* 4, 65121 (2014); and J. H. Urbelis and J. A. Swift, *Cryst. Growth Des.* 14, 1642 (2014). Such irregularity in particle size and shape makes reproducibility and prediction of EM performance difficult. Additionally, detonation "hot spots" caused by sharp edges dramatically compromises EM stability. See M. Ghosh et al., *Cryst. Growth Des.* 14, 5053 (2014). Therefore, a need remains for CL-20 particles with small crystal size, spherical morphology and minimum crystalline defects.

SUMMARY OF THE INVENTION

The present invention is directed to a method for recrystallization of hexanitrohexaazaisowurtzitane (CL-20) from irregular bulk powders using a surfactant assisted self-assembly process to produce uniform spherical micron-sized particles. The method comprises providing a first solution comprising CL-20 and a first solvent; providing a second solution comprising a second solvent that is immiscible in and has a higher boiling point than the first solvent; providing a surfactant in the first or the second solution; mixing the first and the second solutions to form an emulsion comprising the first solvent dispersed in the second solvent; and evaporating the first solvent to form particles of CL-20. For example, the high volatility first solvent can comprise ethyl acetate and the second solvent can comprise octane. Ethyl acetate enables complete dissolution of CL-20 and has lower boiling point than octane so that the ethyl acetate can be removed first and faster than octane through vacuum. The surfactant preferably comprises a nonionic surfactant, such as sorbitan monoleate. The surfactant concentration must be sufficient to assist the self-assembly process of nucleation and growth of spherical CL-20 particles. Finally, processing at room condition is preferable so that CL-20 forms favorable phases such as ε- or, β-phase crystal structure, rather than the less desirable gamma phase which may form at high temperature. In an exemplary method, the average CL-20 particle size formed centered at approximately 1 µm. XRD and Raman results detected the orthorhombic β-phase crystal structure. The uniform spherical morphology of these microparticles is a significant improvement of microstructure compared with other crystallization methods. The CL-20 microparticles are expected to display enhanced functional reproducibility due to their monodisperse nature as well as decreased shock sensitivity due to their sub-2 µm particle size.

BRIEF DESCRIPTION OF THE DRAWINGS

The detailed description will refer to the following drawings, wherein like elements are referred to by like numbers.

FIG. 3($a$) is a scanning electron micrograph (SEM) of the raw CL-20 energetic material feedstock powder. FIG. 3($b$) is an SEM of the CL-20 particles after self-assembly using surfactants. FIG. 3($c$) is a bar graph showing the CL-20 particle size distribution after self-assembly.

FIG. 5($b$) is a graph of particle growth for varying initial EA:OCT volume ratio. The initial CL-20 concentration was 10 mg/mL and $P_{outside}$ was 1 kPa. FIG. 5($c$) is a graph of particle growth for varying vacuum level.

FIGS. 7(a)-(c) are Raman spectra of CL-20 microparticles. FIG. 7(a) is a Raman spectrum with full collection range with signal modes labeled. FIG. 7(b) is a zoom-in of the C—H stretch region. FIG. 7(c) is a zoom-in of the ring stretch region. The literature peak positions of the four possible phases of CL-20 are provided by indicators.

DETAILED DESCRIPTION OF THE INVENTION

Morphological control of energetic materials is highly desired because ill-defined morphology arising from variations in processing method and supplier makes it impossible to reproducibly engineer their physicochemical properties. As the most powerful, non-nuclear energetic material to date, 2,4,6,8,10,12-hexanitro-2,4,6,8,10,12-hexaazaisowurtzitane (CL-20) has been the subject of significant interest for improved applications in military grade explosives. The present invention is directed to a surfactant-assisted self-assembly method to synthesize CL-20 particles with controlled morphology. According to the invention, an interfacially driven microemulsion (μ-emulsion) is used to initiate self-assembly and formation of uniform particles. In general, the emulsion can be formed by mixing a solution comprising a low-boiling solvent and an energetic material feedstock with another solution comprising an immiscible solvent. Volatility contrast (boiling point) is needed between the solvents for emulsion formation and so that the volatile solvent can be readily removed after particle self-assembly and crystallization. For example, the solvent system can comprise a low boiling point polar aprotic solvent (e.g., ethyl acetate, acetone) and a higher boiling point hydrocarbon solvent (e.g., heptane, octane). The dispersed phase to continuous phase volume ratio can be controlled to be preferably about 1:10. The mixture can also comprise a surfactant. By means of vigorous stirring or sonication, a surfactant-stabilized μ-emulsion is obtained in which the feedstock particles are well dispersed inside μ-emulsion droplets. The low-boiling solvent can be subsequently removed from the μ-emulsion system by vacuum evaporation or mild-heating. As the solvent evaporates from the μ-emulsion droplets, the droplets shrink and the energetic material concentration therein rises, inducing self-assembly of the energetic material particles through noncovalent interactions inside the confined 3D emulsion droplet spaces. The balanced interactions (e.g., van der Waals, dipole-dipole interactions, particle-particle attractions, etc.) between particles lead to formation of uniform particles with controlled shape and size. The method can eliminate inconsistent performance by providing a reproducible method to improve energetic materials for explosive applications.

Figure 1:
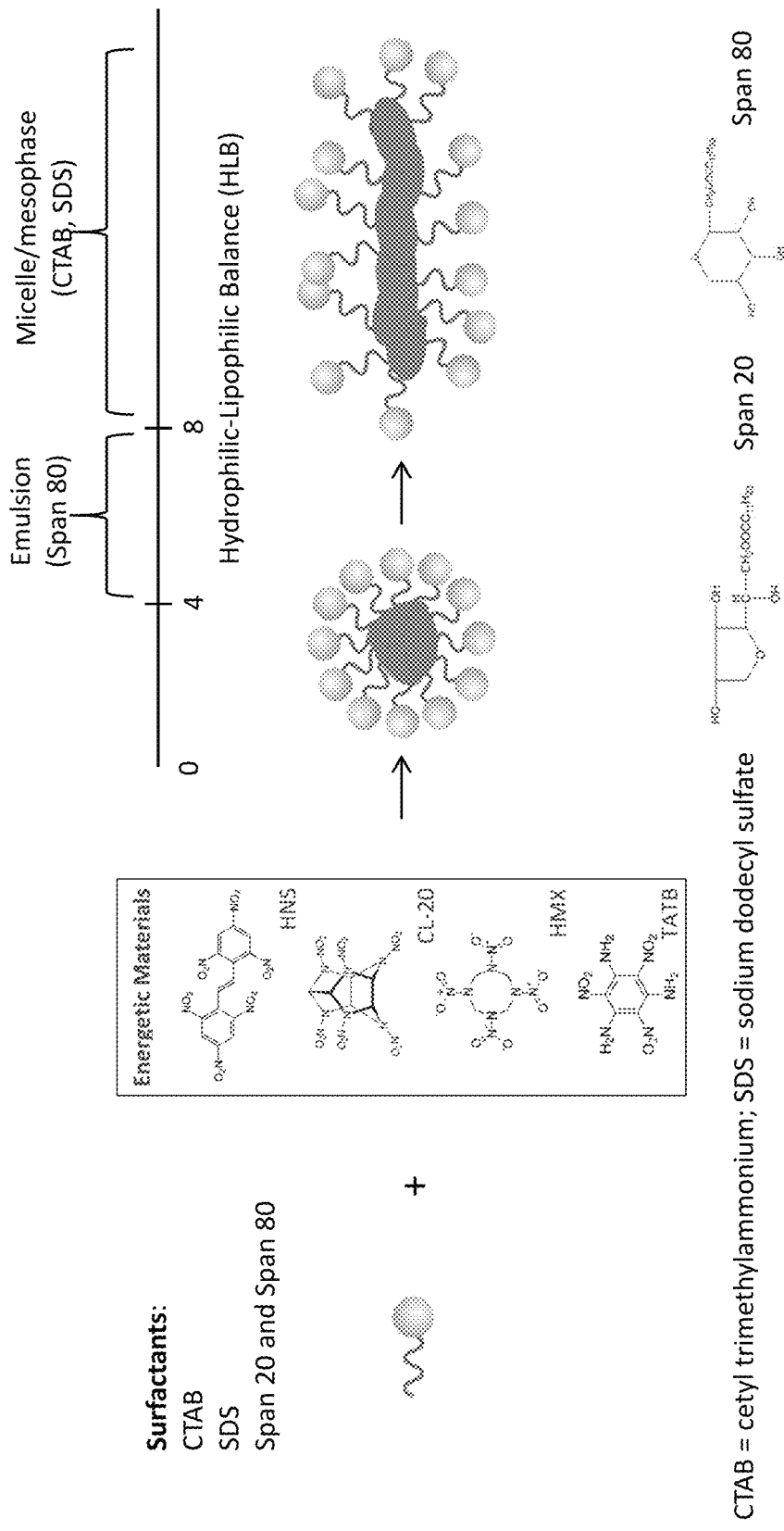
FIG. 1 is a schematic illustration of a surfactant-assisted cooperative self-assembly (micelle/emulsion) method to reprocess energetic materials and control their morphologies.

FIG. 1 is a schematic illustration of a generalized surfactant-assisted cooperative self-assembly (micelle/emulsion) method to reprocess energetic materials and control their morphologies. Common energetic materials that can be used include hexanitrostilbene (HNS), hexanitrohexaazaisowurtzitane (CL-20), cyclotetramethylene-tetranitramine (HMX), and triaminotrinitrobenzene (TATB). Two types of surfactants can be used, including ionic surfactants, such as cetyl trimethylammonium bromide (CTAB) and sodium dodecyl sulfate (SDS), and nonionic surfactants, such as sorbitan ester, ethoxylated sorbitan ester, or polyethylene glycol alkyl ether. For example, Span 20 (sorbitan monolaurate) and Span 80 (sorbitan monooleate) are inexpensive non-ionic surfactants widely used in the food, medicine, and beauty industries (Span® 20 and Span® 80 are registered trademarks of Corda International PLC). The amphiphilic surfactants consist of a molecule that combines both hydrophilic (water-loving or polar) and lipophilic (oil-loving or non-polar) groups). The hydrophilic-lipophilic balance (HLB) of a surfactant expresses the balance of the size and strength of the hydrophilic and the lipophilic groups. A surfactant that is lipophilic in character has a low HLB number, and one that is hydrophilic has a high HLB number. For example, the HLB is preferably between 4-8 for a nonionic surfactant to form a good emulsion. Therefore, the Span surfactants have an HLB between 4 and 8, whereas the CTAB and SDS surfactants have an HLB greater than 8.

Figure 2:
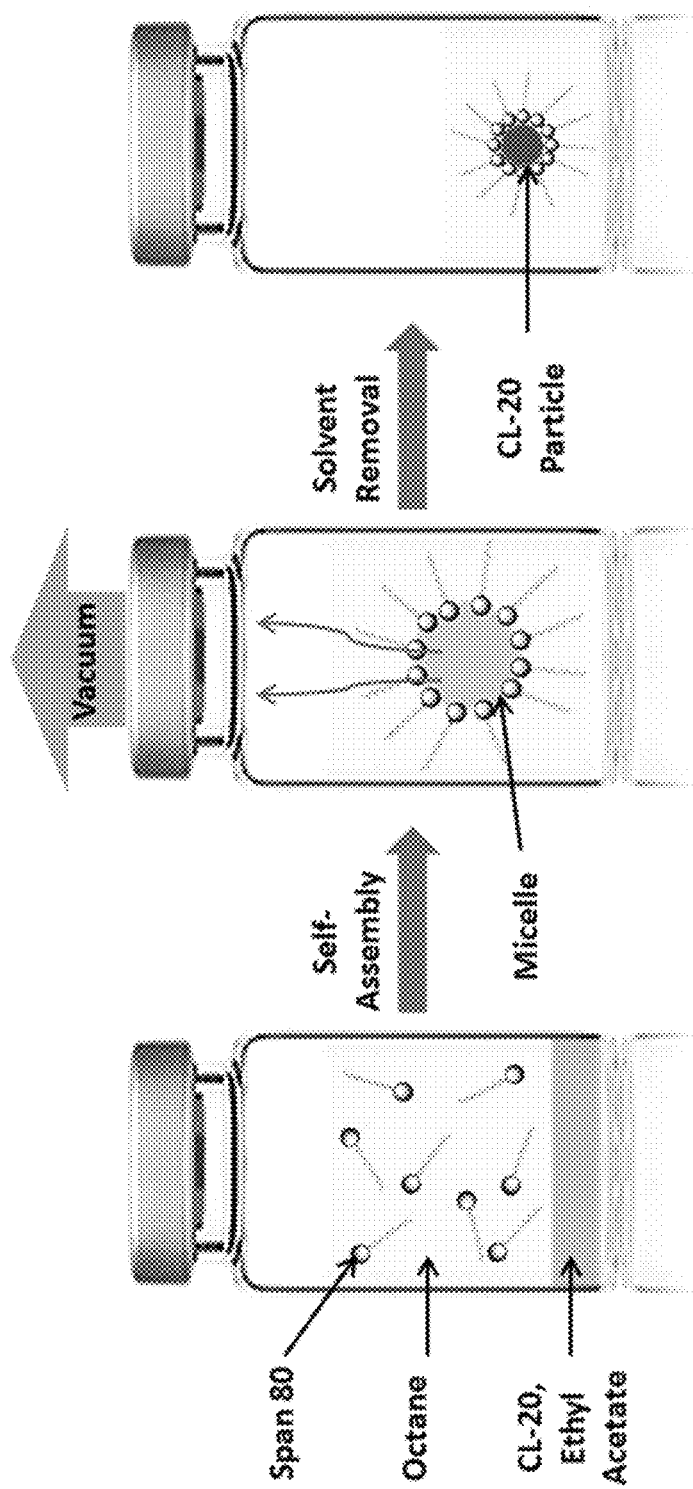
FIG. 2 is a schematic illustration of an apparatus for the surfactant assisted self-assembly and crystallization of CL-20 microparticles under vacuum.

According to the present invention, monodisperse 2,4,6,8,10,12-hexanitro-2,4,6,8,10,12-hexaazaisowurtzitane (CL-20) particles were formed through an emulsion process, as illustrated schematically in FIG. 2. CL-20 powder was first dissolved in a good solvent, high volatility polar ethyl acetate (EA, bp=77° C.), and stirred mildly until complete dissolution to obtain a 5 mg/mL clear solution. Separately, a surfactant solution of Span 80 (10 mM) was prepared in a non-polar anti-solvent, octane (OCT, bp=125° C.). Span 80 was chosen as the surfactant because it facilitates the self-assembly of water-in-oil type micelles encapsulating the good solvent. 1.0 mL of the CL-20 solution was then added into 10 mL of the surfactant solution and shaken to mix. Neither visible precipitation nor phase separation occurred. While stirring, a vacuum of 8 torr was applied to the mixture to preferentially remove EA, which has a lower boiling point than OCT. Vacuum evaporation allows solvent removal at room temperature. After approximately 14 minutes, the solution became cloudy with fine white precipitates visible. The cloudiness increased and was more fully noticeable at 17 minutes. As solid precipitated, it was allowed to stir for 2 hours for complete reaction. The final suspension appeared very cloudy with fine white precipitate which was washed twice with hexane to remove any residual surfactant remaining in the solution. The final solid product was re-suspended in a minimal amount of hexane (~1 mL) for storage.

A representative SEM image of the product CL-20 particles is shown in FIG. 3(b). Using the micelle-based synthesis, nearly spherical particles were obtained. The microparticles of highest quality displayed a small average diameter of 985 nm with a very narrow size distribution evidenced by a standard deviation of 138 nm, or 14%, as shown in FIG. 3(c). This is a significant improvement in microscopic morphology, compared with the as-received raw material of CL-20 powder shown in FIG. 3(a), which comprised faceted particles of several microns in size and showed no sign of monodispersity in either size or shape. These uniform, quasi-spherical microparticles of CL-20 are expected to be capable of being processed into EM reproducible and predictable performance.

A finite element simulation of the growth process was performed. The simulation accounted for the interplay of the following three factors:

1) Removal of the solvent vapor, wherein the flow rate is given by $$F = (P_{inside} - P_{outside})/\text{resistance}$$

2) Binary diffusion in the liquid phase, wherein the mass flux is given by $$J_1 = -D_{12} \frac{dc_1}{dz}$$

3) CL-20 solubility in the EA-OCT mixture, wherein the solubility is given by $$w = \frac{w_o}{1 - e^B}(e^{BX_2} - e^B)$$

The flow rate F determines how fast solvents are removed. It's driven by pressure difference between the vessel and the suction vacuum, $P_{inside} - P_{outside}$. The resistance in the vacuum system was obtained by data fitting. Fick's law regulates the binary EA/OCT diffusion flux in the liquid phase. The diffusivity $D_{12}$ was calculated by the Tyn-Calus method. The diffusivity varies with composition. The solubility of CL-20, w, depends on the composition of EA/OCT mixture. The more anti-solvent OCT ($X_2$), the lower the solubility of CL-20. $w_0$ is the solubility of CL-20 in pure EA. B is a parameter to be determined.

The simulation modeled solvent mass transfer from the liquid to gas and solvent removal from the gas phase by vacuum evaporation. The quantities simulated over time at all positions included EA/OCT composition, liquid level, CL-20 concentration in liquid, and particle size. The parameters obtained included evaporation behavior, solubility of CL-20 in the binary EA/OCT mixture, crystallization, and particle growth behavior. When the solubility of CL-20 in the EA-OCT mixture decreases due to the evaporation of EA, a concentration gradient of EA formed with a lower EA fraction near interface. The gradient causes diffusion in liquid phase between EA and OCT. As the solubility of CL-20 in the binary mixture drops, precipitation of the CL-20 particles begins near the liquid/gas interface and then propagates downward. The particle growth can be monitored in-situ by dynamic light scattering (DLS).

Figure 4:
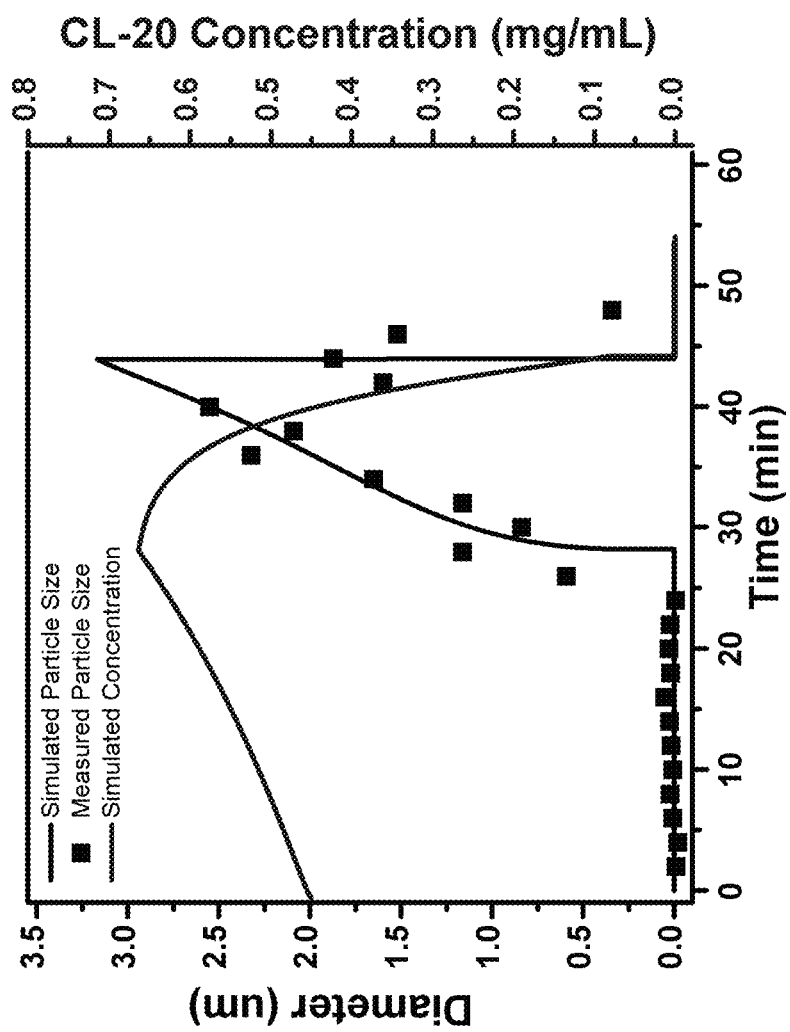
FIG. 4 is a graph of simulated and measured particle size, and CL-20 concentration in solution as a function of processing/stirring time.
Figure 5A:
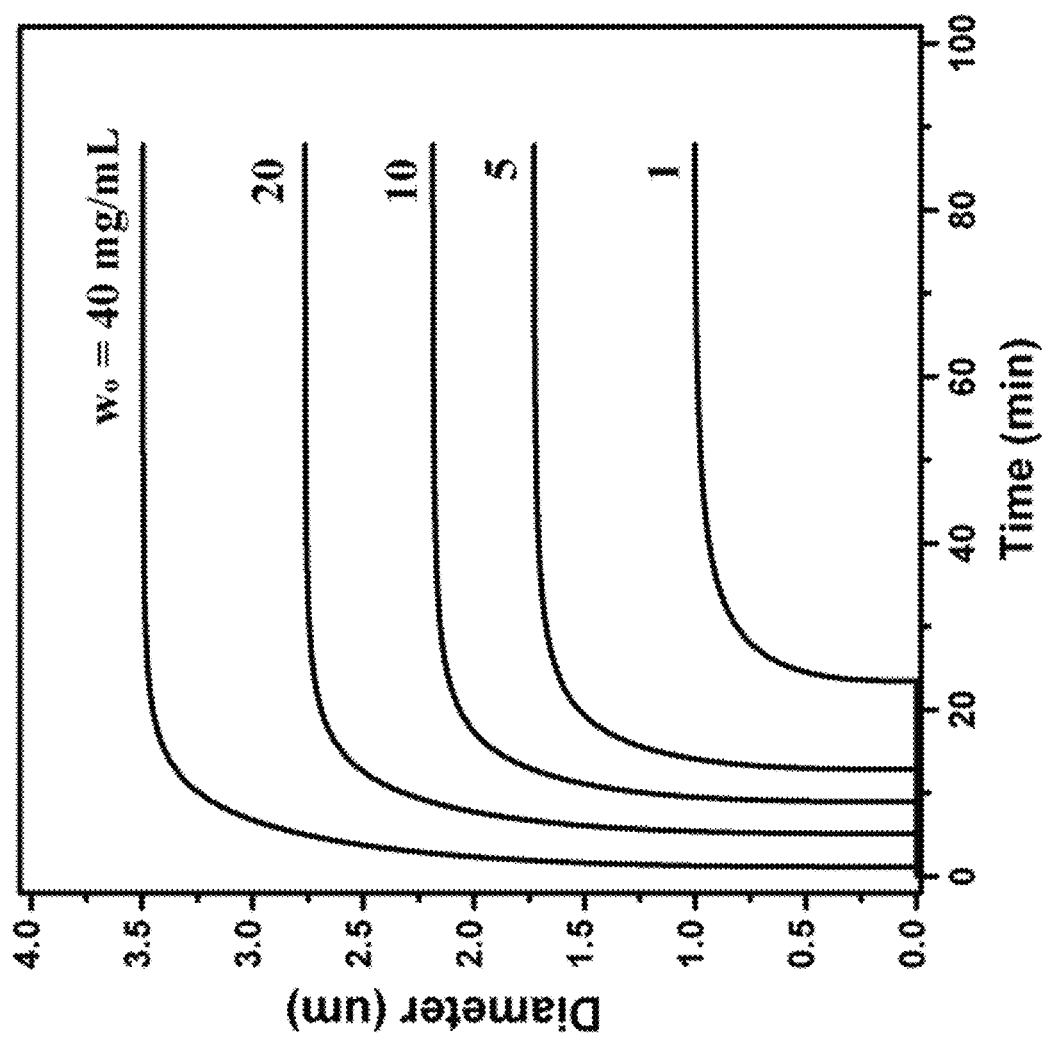
FIG. 5($a$) is a graph of particle growth for varying initial CL-20 concentration. The initial ethyl acetate (EA)/octane (OCT) volume ratio was 1:1 and $P_{outside}$ was 1 kPa.
Figure 5B:
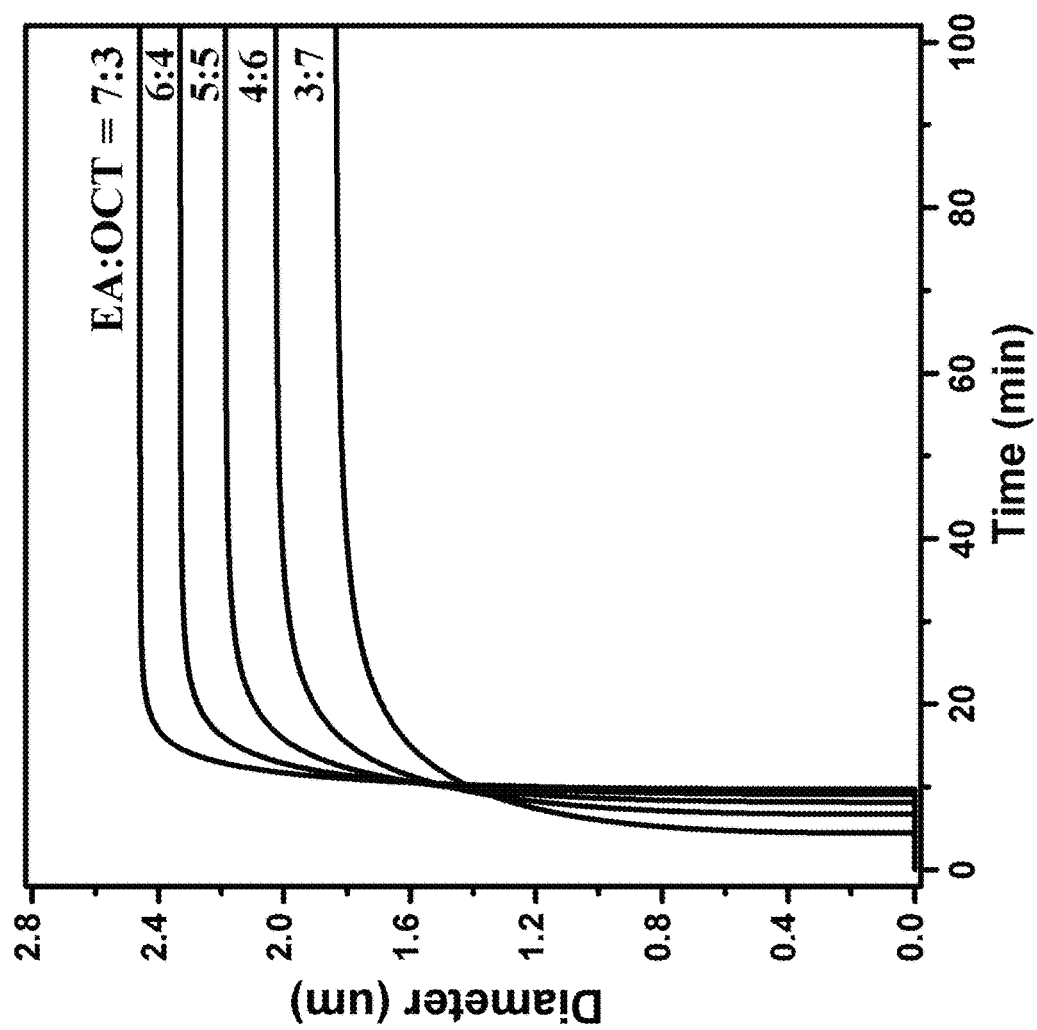
Figure 5C:
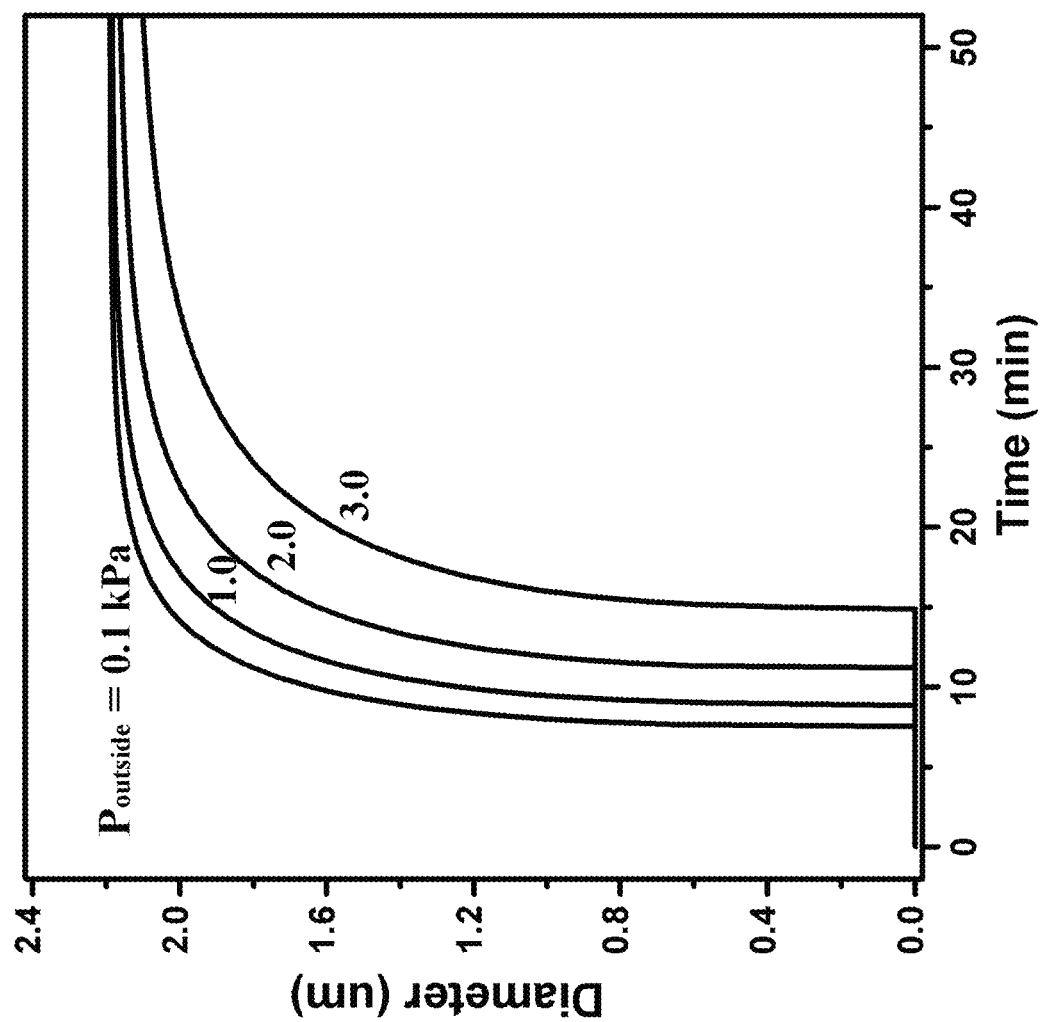

The simulation parameters were determined by fitting the experimental data. The parameters were then used to simulate homogeneous particle growth. FIG. 4 shows a comparison of the simulated particle size and the measured particle size, and the CL-20 concentration in solution, as a function of time. The final particle size can be controlled by initial CL-20 concentration $w_0$, as shown in FIG. 5(a), and the EA:OCT volume ratio, as shown in FIG. 5(b). The kinetics of particle growth can be controlled by vacuum level ($P_{outside}$), as shown in FIG. 5(c).

Recrystallization of CL-20 particles by mixing EA solution with non-polar anti-solvents had been previously reported. However, none of them display uniform microstructures. See J. Xu et al., *J. Cryst. Growth* 354, 13 (2012); and J. H. Urbelis and J. A. Swift, *Cryst. Growth Des.* 14, 1642 (2014). Therefore, as a controlled experiment, the above synthesis was repeated with exactly same parameters except for that no surfactant was used. Faceted rod-shaped particles were precipitated. These rods showed a slightly better uniformity in size and shape than the raw material, but still not comparable with the nanospheres of the present invention. Therefore, the surfactant is essential to the formation of the uniform quasi-spherical CL-20 microparticles. On one hand, the surfactant facilitates the formation of micelles of similar size. Each micelle contains a finite package of CL-20 solution. As the good solvent EA was removed by vacuum, the concentration of CL-20 increased until it reaches the solubility when crystallization occurred within the micelles. This process defines the average size and monodispersity of the product microparticles. One the other hand, CL-20 crystallizes almost exclusively into faceted particles due to its strong tendency to form well-defined molecular crystals. The exception of spherical shape in present invention is likely to attribute to the interference of crystallization from Span 80 molecule's sorbitan ring which is similar to the rings of CL-20. A similar analogy has been observed with porphyrins. In that case, the surfactant of sodium dodecyl sulfate selectively bonds to porphyrin molecules to interfere crystallization and resulted in spherical rather than faceted particles. See Y. Zhong et al., *ACS Nano* 8(1), 827 (2014).

Figure 6:
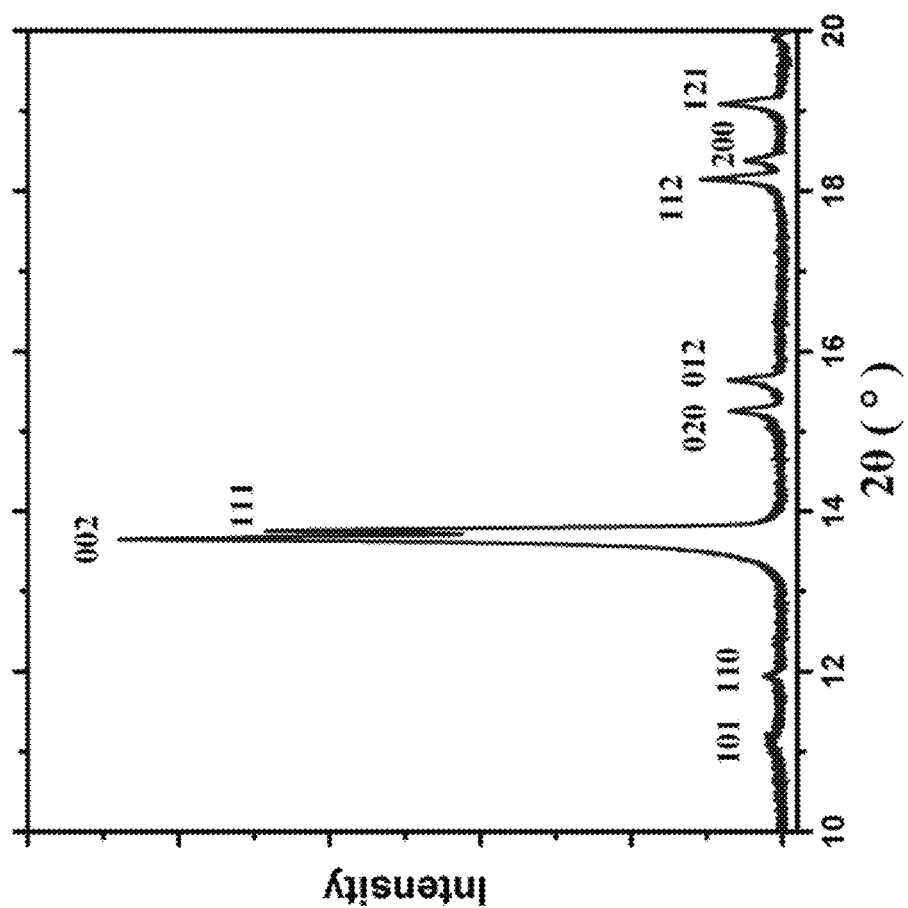
FIG. 6 is a powder X-ray diffraction (XRD) pattern of the CL-20 microparticles synthesized by the micelle confinement method revealing the orthorhombic β-phase of molecular crystal lattice. The peaks are labeled with corresponding Miller indices.

Under ambient conditions, CL-20 can exist as one of four polymorphic phases, namely α, β, γ, and ε. See P. Goede et al., *Propellants, Explos., and Pyrotech.* 29, 205 (2004); and T. P. Russell et al., *J. Phys. Chem.* 97, 1993 (1993). It is desirable to obtain pure-phase CL-20 particles even though recrystallization typically produces a mixture of different crystal structures. See J. Xu et al., *J. Cryst. Growth* 354, 13 (2012). To confirm the composition of the microparticles of the present invention, the particles were characterized by powder X-ray diffraction (XRD) and Raman spectroscopy. The XRD pattern in FIG. 6 revealed that the CL-20 particles have an orthorhombic β-phase crystal structure. See P. Goede et al., *Propellants, Explos., and Pyrotech.* 29, 205 (2004); and C. Guo et al., *J. Mol. Struct.* 1048, 267 (2013). All of the peaks were indexed to belong to an orthorhombic lattice with lattice parameters a=9.684 Å, b=11.587 Å, and c=12.987 Å. This is consistent with literature values with very slight volumetric lattice shrinkage of 0.5% which can possibly be explained by inward surface tension due to the small particle size. See J.-J. Tan et al., *Physica B: Condens. Matter* 406(15-16), 2925 (2011). Another feature observed in the XRD pattern is that the (002) peak was stronger than (111) peak. However, in an ideal powder sample of orthorhombic crystal, (002) peak is predicted to be approximately four times weaker than (111) peak. The exceptionally strong (002) peak indicates better stacking ordering in the c-axis. It also suggests Span 80 might have interfered with crystallization in the a and b directions and prevented the formation of larger faceted particles.

To confirm the purity, the same sample was examined by sensitive Raman spectroscopy. As shown in FIG. 7(a), the full Raman spectrum comprises characteristic peaks of the β-phase of CL-20. See P. Goede et al., *Propellants, Explos., and Pyrotech.* 29, 205 (2004). Five major vibration modes in CL-20 were identified and labeled. To exclude the presence of the other three phases, two regions of the spectrum were examined. In FIGS. 7(b) and 7(c), the comparison of Raman peaks of microparticles with the literature peak confirmed that these particles have β-phase molecular crystal.

The present invention has been described as a method to synthesize energetic materials with controlled morphology. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method to synthesize energetic material particles, comprising:
   providing a first solution comprising hexanitrohexaazaisowurtzitane and a first solvent;

providing a second solution comprising a second solvent that is immiscible in and has a higher boiling point than the first solvent;

providing a surfactant in the first or the second solution, wherein the surfactant comprises a nonionic surfactant having a hydrophilic-lipophilic balance between 4 and 8;

mixing the first and the second solutions to form an emulsion comprising the first solvent dispersed in the second solvent; and evaporating the first solvent to form particles of hexanitrohexaazaisowurtzitane.

2. The method of claim 1, wherein the first solvent comprises a polar aprotic solvent.

3. The method of claim 2, wherein the polar aprotic solvent comprises ethyl acetate or acetone.

4. The method of claim 1, wherein the second solvent comprises a hydrocarbon.

5. The method of claim 4, wherein the hydrocarbon comprises heptane or octane.

6. The method of claim 1, wherein the surfactant comprises an ionic surfactant.

7. The method of claim 6, wherein the ionic surfactant comprises cetyl trimethylammonium bromide or sodium dodecyl sulfate.

8. The method of claim 1, wherein the nonionic surfactant comprises a sorbitan ester, ethoxylated sorbitan ester, or polyethylene glycol alkyl ether.

9. The method of claim 1, wherein the hexanitrohexaazaisowurtzitane particles are spherical in shape.

10. The method of claim 1, wherein the hexanitrohexaazaisowurtzitane particles are less than 4 microns in diameter.

11. The method of claim 1, wherein the hexanitrohexaazaisowurtzitane particles have an orthorhombic β-phase crystal structure.

* * * * *